US012001534B2

(12) United States Patent
Azam et al.

(10) Patent No.: US 12,001,534 B2
(45) Date of Patent: Jun. 4, 2024

(54) BIOMETRIC INPUT DEVICE

(71) Applicant: Hewlett-Packard Development Company, L.P., Spring, TX (US)

(72) Inventors: Syed Azam, Spring, TX (US); Alexander Williams, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 126 days.

(21) Appl. No.: 17/418,883

(22) PCT Filed: Jul. 19, 2019

(86) PCT No.: PCT/US2019/042680
§ 371 (c)(1),
(2) Date: Jun. 28, 2021

(87) PCT Pub. No.: WO2021/015723
PCT Pub. Date: Jan. 28, 2021

(65) Prior Publication Data
US 2022/0138297 A1    May 5, 2022

(51) Int. Cl.
*G06F 21/32* (2013.01)
*G06F 3/02* (2006.01)
*G06V 40/12* (2022.01)
*H04L 9/40* (2022.01)

(52) U.S. Cl.
CPC .............. *G06F 21/32* (2013.01); *G06F 3/021* (2013.01); *G06V 40/1365* (2022.01); *H04L 63/08* (2013.01)

(58) Field of Classification Search
CPC ..... G06F 21/32; G06F 3/021; G06V 40/1365; G06V 40/70; H04L 63/08
See application file for complete search history.

(56) References Cited

U.S. PATENT DOCUMENTS

| 8,134,449 | B2 | 3/2012 | Wu et al. |
| 8,376,860 | B1 | 2/2013 | Boutin |
| 8,550,339 | B1 * | 10/2013 | Newman .................. G07C 9/37 340/5.82 |
| 10,272,344 | B2 | 4/2019 | Kelly |
| 10,773,156 | B2 * | 9/2020 | Colenbrander ........ H04N 21/63 |
| 10,812,479 | B2 * | 10/2020 | Apturkar ............... H04L 9/3231 |
| 10,933,309 | B2 | 3/2021 | Andall |
| 11,724,177 | B2 * | 8/2023 | Huang ................... A63F 13/24 463/37 |

(Continued)

FOREIGN PATENT DOCUMENTS

| WO | WO 2013/145280 A1 * | 10/2013 | ............... G06T 7/00 |
| WO | 2018/038545 A1 | 3/2018 | |

*Primary Examiner* — Christopher A Revak
(74) *Attorney, Agent, or Firm* — Quarles & Brady LLP

(57) ABSTRACT

In an example implementation according to aspects of the present disclosure, an input device of a plurality of input switches, a plurality of biometric sensors integrated into each of the plurality of input switches and a processor. The processor configured to receive an indication from a first input switch. The processor receives a biometric data collected by one of the biometric sensors. The processor determines whether the received indication corresponds with a first state in a predetermined sequence. The processor determines whether the biometric data corresponds with as second state in a predetermined biometric data sequence. The processor authenticates the user based on the first and second states.

15 Claims, 4 Drawing Sheets

(56) References Cited

U.S. PATENT DOCUMENTS

| | | | |
|---|---|---|---|
| 2005/0239524 A1 | 10/2005 | Longman et al. | |
| 2010/0158327 A1* | 6/2010 | Kangas | G06F 21/32 |
| | | | 382/124 |
| 2012/0219193 A1 | 8/2012 | Muth | |
| 2016/0210624 A1 | 7/2016 | Niu | |
| 2017/0111337 A1* | 4/2017 | Saboori | H04L 63/08 |
| 2018/0158278 A1* | 6/2018 | Dabrowski | G07F 17/32 |
| 2018/0349588 A1 | 12/2018 | Abdelmoneum | |
| 2019/0046884 A1 | 2/2019 | Hino et al. | |
| 2019/0137348 A1 | 5/2019 | Lyon et al. | |
| 2019/0140833 A1* | 5/2019 | Grajek | G06F 21/32 |
| 2020/0125705 A1* | 4/2020 | Moiduddin | G06F 21/31 |
| 2022/0057865 A1* | 2/2022 | Ballagas | G06F 3/015 |
| 2022/0121735 A1* | 4/2022 | Shah | G06K 7/1417 |

* cited by examiner

BIOMETRIC INPUT DEVICE

BACKGROUND

Input devices may be utilized by users to interface with a system for a variety of activities including productivity and computer gaming. Input devices may utilize a host of buttons to receive user input and transmit that input to a computing system that translates the input into a corresponding action.

DETAILED DESCRIPTION

Personal computing (PC) and/or console gaming provides an immersive interactive experience for a user. The input devices, often implemented as a gaming controller, provide basic inputs for a user to interface with their respective systems. PC and/or console gaming systems often include personalized user information that often needs to be secured. The user information may include detailed information regarding a players gaming habits, monetary information, gaming associates, and additional information provided by the user to the system for a more enjoyable experience. Often current systems provide rudimentary input systems for securing through authentication and authorization of a user. Described herein is a biometric input device for authorizing and authenticating a user both locally on a system and with an online service, such as online game services as well as online purchasing systems, or other online systems where authentication or authorization services may be utilized. The biometric input device provides physical identification of a user as well as a mental password identification. Authentication of a user can only occur so long as the user provides both a correct input of a sequence of input strokes as well as biometric information corresponding to those input strokes.

In one implementation, a biometric input device may include a number of input switches. The input switches may include but are not limited to digital buttons, analog buttons, digital trigger switches, analog triggers switches, directional pads, and control sticks. Correspondingly, one or more biometric sensors may be integrated into the each of the input switches. A processor may be integrated into the biometric input device to receive indications from the input switches, receive corresponding biometric information from the biometric sensors, determine the relationship of the indications and biometric information in relations to a sequence, and authenticate a user based on the states of the sequence.

Figure 1:
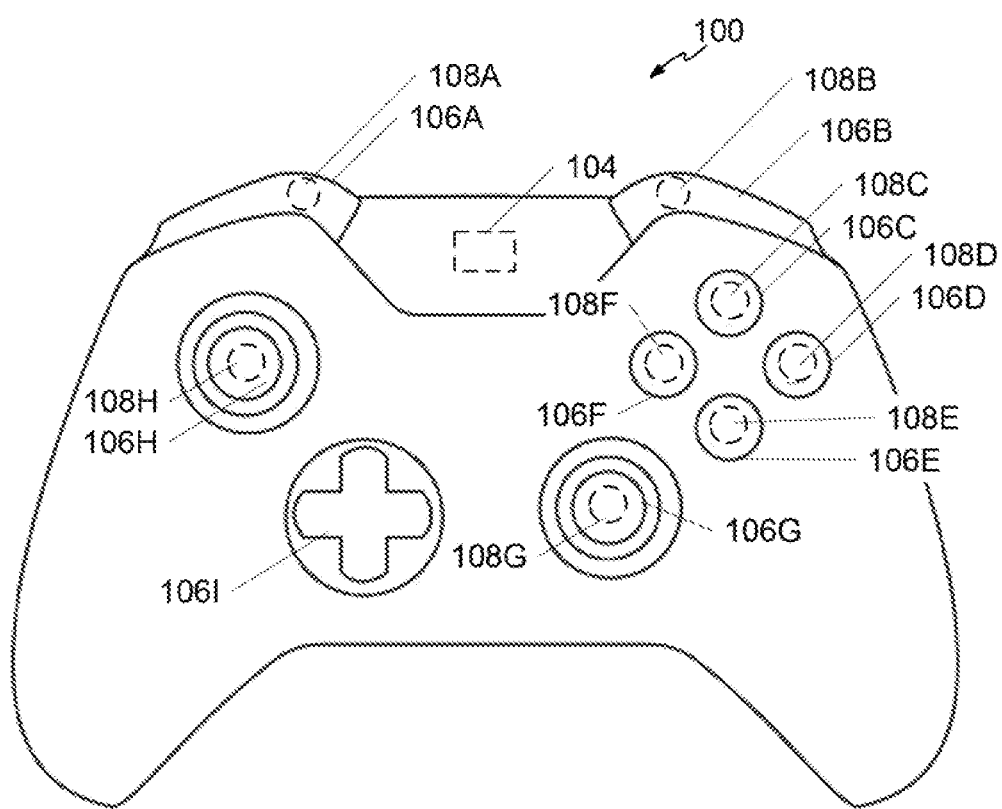
FIG. 1 illustrates a system corresponding to a biometric input device, according to an example.

FIG. 1 illustrates a system corresponding to a biometric input device 100, according to an example. The biometric input device 100 may include a processor 104 a plurality of input switches 106A-106I, and a plurality of biometric sensors 108A-108H. The plurality of input switches 106A-106I may be implemented as electromechanical switches including digital and analog buttons (input switches 106C-106F), digital and analog triggers switches (input switches 106A-106B), directional pads (input switch 106I), and control sticks (106G-106H). In another implementation of the biometric input device 100, the form factor of the biometric input device 100 may be a keyboard, and the plurality of input switches 106-106I may alphanumeric keyboard inputs (not shown). In some implementations of the biometric input device 100, some input switches such as input switch 106I may not have a corresponding biometric sensor and thereby would not be used in any authentication enrollment.

The plurality of biometric sensors 108A-108H may include biometric input devices such as fingerprint scanners, capacitive resistance detectors, voice input and recognition devices, and light detection sensors. The plurality of biometric sensors 108A-108H may be utilized individually or in combination to identify a user by biometrics including but not limited to fingerprint recognition, voice recognition, capacitive resistance of a user, and vein patterns.

The processor 104 may be communicatively coupled to both the plurality of input switches 106A-106I, and the plurality of biometric sensors 108A-108H wherein the processor 104 may receive electro-mechanical input from the plurality of input switches and the plurality of biometric sensors. The processor 104 may be an embedded microcontroller with integrated logic specifically to support the receipt of input from both the plurality of input switches 106A-106I, and the plurality of biometric sensors 108A-108H. The processor 104 may include supportive circuitry and logic to connect to a personal computer (PC) or a console gaming system Additionally, processor 104 may include circuitry and logic to connect to a service. The service may be an online authentication system. The online authentication system may be a part of a larger interactive video game online system. A user may authenticate with the biometric input device 100 and the biometric input device may connect to a corresponding interactive video game online system. In another implementation the online authentication system may be utilized for operating system authentication and authorization for commercial systems. For example, the biometric input device 100 may be a keyboard providing input into a PC connected to a corporate information technology system. The biometric input device 100 may provide support to authenticate and authorize a user of that corporate information technology system.

The plurality of input switches 106A-106I may include an integration of the plurality of biometric sensors 108A-108H. In one implementation, the plurality of input switches 106A-106H and the plurality of biometric sensors 108A-108H may include a one to one relationship, wherein any button input or press includes a receipt of biometric scan data. The integration of the plurality of biometric sensors 108A-108N may place the sensors on the user accessible surface of the plurality of input switches 106A-106H. Additionally, in another implementation, an input switch 106I may not include a biometric sensor. In other implementations, each of the plurality of input switches 106A-106I may include more than one biometric sensors.

As with some authentication systems, the biometric input device 100 may include an authentication enrollment procedure. The enrollment procedure may include the user creating a predetermined sequence of inputs of the plurality of input switches 106A-106I and corresponding readings of plurality of biometric sensors 108A-108H, thereby creating a both a predetermined sequence of inputs and predetermined biometric data sequence. The predetermined sequence of inputs may be a sequence of input switch, or button, activations. In one implementation, there may be a one to one mapping of an entry in the predetermined sequence of inputs versus the predetermined biometric data sequence. In one or more implementation the predetermined biometric data sequence may correspond to a sequence of fingerprint scans. The enrollment process may create a state machine corresponding to the predetermined sequence of inputs and the predetermined biometric data sequence, where each state in the state machine corresponds to the combination of an electromechanical input (e.g. button press) and biometric input (e.g. fingerprint scan). Successful traversing of all the states the state machine results in user authentication. Additionally, during enrollment, user information for online services may be stored in memory (not shown) of the biometric input device 100. In another implementation, the predetermined sequence of inputs and the predetermined biometric data sequence may be processed simultaneously within the state machine. For example, a user may press button A (illustrated in FIG. 1 as input switch 106F). Button A may have a fingerprint scanner (illustrated in FIG. 1 as biometric sensor 108F), and as such, button A scans the fingerprint upon press. The combination of the button A press and the fingerprint scan at button A may constitute the first state of the state machine. User then presses Button A and trigger B (illustrated by input switch 106B) simultaneously. The fingerprint scanner associated with button A, and now the fingerprint scanner (illustrated by biometric sensor 108B) record the biometric data corresponding to the input press. The combination of the input press of button A, trigger B, the fingerprint scan at button A, and at trigger B, constitute the next state in the state machine. The user may utilize different finger plus button combinations as well as combinations of button presses, to create a unique state machine that would be difficult for another user to replicate.

In another implementation, the state machine based on the predetermined sequence of inputs and the predetermined biometric data sequence may include a time-based aspect, where electromechanical inputs and biometric inputs may occur within a relational time period. In the previous example, the simultaneous input, or near simultaneous input may be an example of the relational time period.

Figure 2:
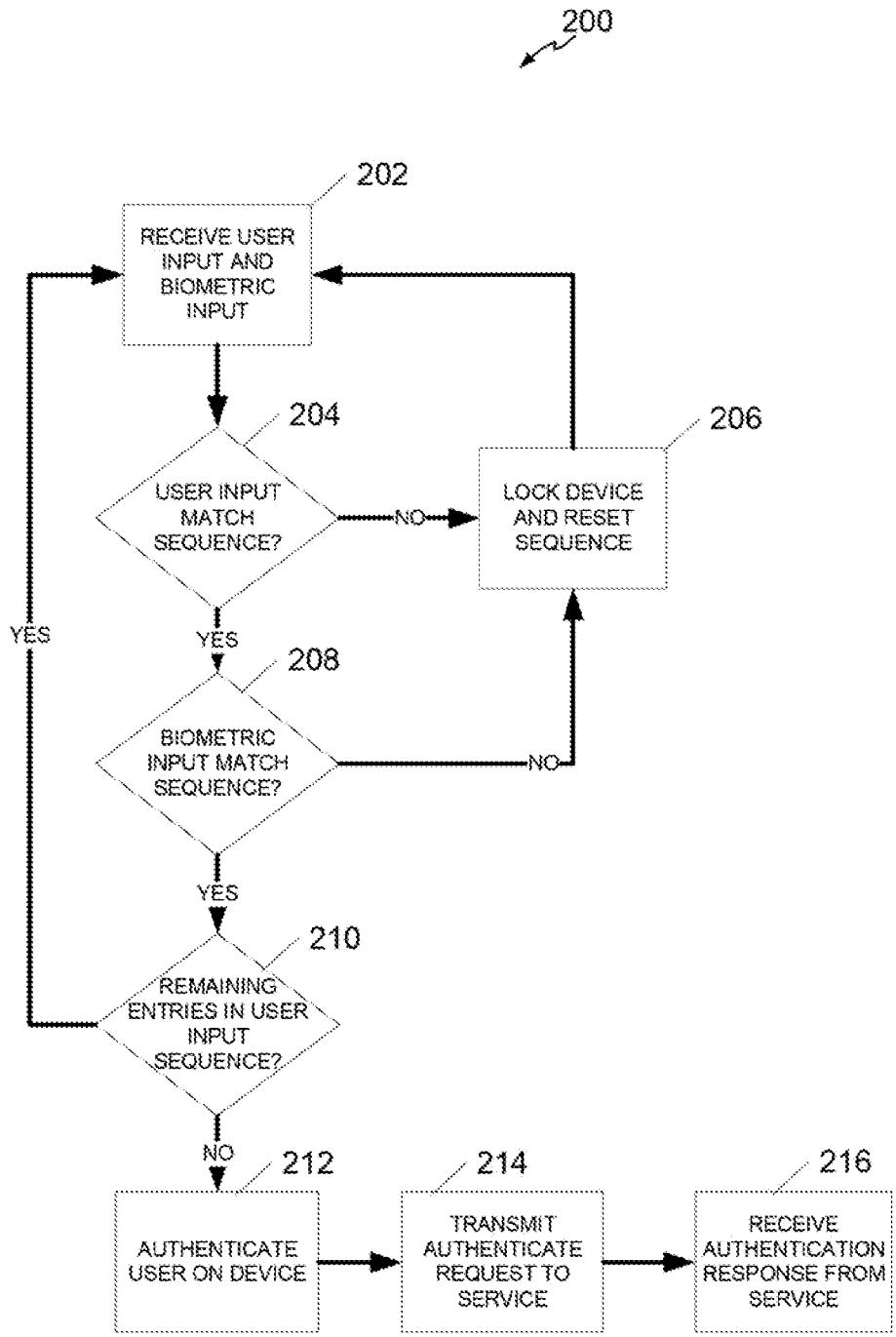
FIG. 2 is a flow diagram illustrating authentication utilizing a biometric input device, according to an example.

FIG. 2 is a flow diagram illustrating authentication utilizing a biometric input device, according to an example. The processor 104 may traverse through a state machine created during the enrollment process. The state machine may correspond to a predetermined sequence of inputs and a predetermined biometric data sequence.

At 202, the processor 104 receives user input and biometric input. The user may provide an input through a button press. Referring back to FIG. 1, the user may input a button press on input switch 106F. Likewise, in pressing the button on input switch 106F, the corresponding biometric sensor 108F, receives a biometric input, such as a fingerprint scan.

At 204, the processor 104 determines user input match to a sequence. The processor 104 retrieves a predetermined sequence and compares the user input to the predetermined sequence. For example, if the user input corresponded to a button press on input switch 106F, the processor 104 may compare that user input to the predetermined sequence to validate that the user input on input switch 106F matches that input in the predetermined sequence.

At 206, the processor 104 locks the biometric input device and resets the sequence state if the user input does not match the sequence. The processor 104 validates that the comparison between the input and the predetermined sequence is false and resets the state machine to the start state. The biometric input device 100 may also be locked wherein no inputs will be processed for a period of time as to thwart hacking attempts.

At 208, the processor 104 determines a biometric input match to a sequence. Likewise, to 204, the processor 104 utilizes the biometric input to compare to the predetermined biometric data sequence and thereby validate both the predetermined sequence and predetermined biometric data sequence are being entered correctly. In the event the biometric input does not match the corresponding state in the predetermined biometric data sequence, the state machine may reset and the biometric input device may lock at 206.

At 210, the processor 104 determines a number of remaining entries in the user input sequence. The processor 104 may determine whether the state machine has been fully exercised and whether the user has traversed the all states of the state machine. If there are remaining states within both the predetermined sequence of inputs and the predetermine biometric sequence, the processor 104 may return to input receipt at 202.

At 212, the processor 104 authenticates user on biometric input device and unlocks local functionality. Once the state machine has been fully traversed and both the predetermined sequence of input and the predetermined biometric inputs have been provided, the biometric input device 100 may be unlocked. The unlocking allows the processor 104 to connect to a PC or gaming console and allow input. The unlocking may also include allowing access to a memory containing user information relating to an online service.

At 214, the processor 104 transmits an authentication request to a service. The processor 104 may transmit any user information relating to an online server after successful unlock. In another implementation, the user information may correspond with the state machine and the predetermined input sequence and the predetermined biometric data sequence. The user information may be used by the service or online server to authenticate the user and/or authorize the user to utilize the online server or service provided.

Figure 3:
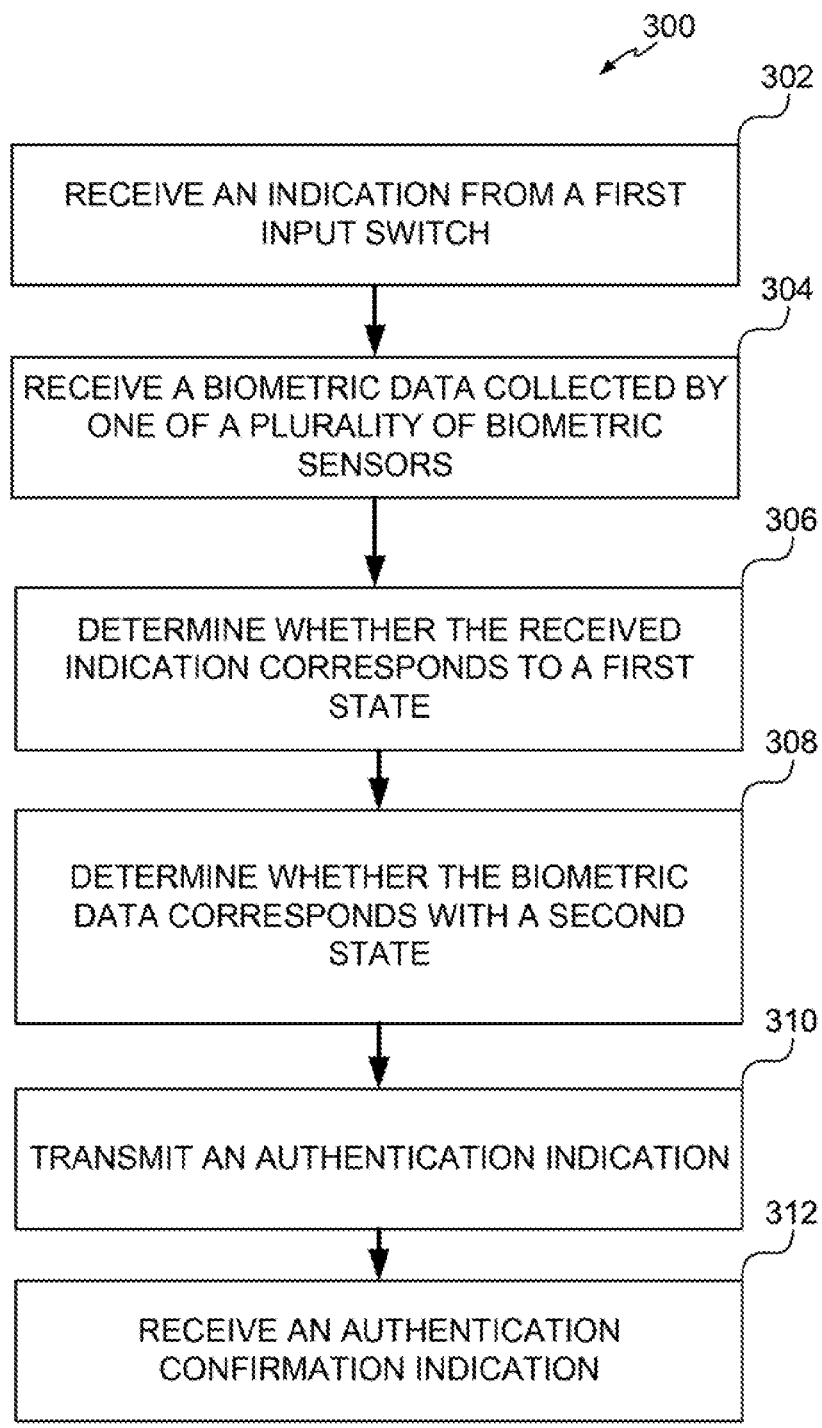
FIG. 3 is a flow diagram illustrating a method for implementing a biometric input device, according to an example.

At 216, the processor 104 receives authentication response from the service. The processor 104 may receive an authentication response from the service indicating that the user has been authenticated on the online server or service and has been authorized to use the service or a subset of the service, FIG. 3 is a flow diagram illustrating a hod for implementing a biometric input device, according to an example.

At 302, the processor 104 receives an indication from a first input switch. The indication, as described in reference to FIG. 2, may include a button press, where the input switch is integrated to a button. The processor 104 stores the received indication for future processing.

At 304, the processor 104 receives a biometric data collected by one of a plurality of biometric sensors. In an implementation where the biometric sensors are integrated into the input switches, the biometric data may be a fingerprint scan. However, in another implementation, the biometric data may be a voice recording associated with the indication from the first input switch. For example, when a user presses a button, the user may also say a certain word which identifies not only the user by their voice, but also a word as a biometric data in a sequence.

At 306, the processor 104 determines whether the received indication corresponds to a first state. As described in reference to FIG. 2, the processor 104 may step through a state in a state machine and validate a received indication against a predetermined sequence of inputs corresponding to the state machine. The first state corresponds to a state in the state machine of the received indication.

At 308, the processor 104 determines whether the biometric data corresponds with a second state. Likewise, the processor 104 in traversing the state machine may validate a biometric data corresponds to a state in the state machine. The second state may correspond to a state in the state machine of the received biometric data. In one implementation the first state and the second state, may correspond to the same state in the state machine. Once the processor 104 has traversed the entire state machine and received corresponding indications and biometric data, the processor 104 may unlock the biometric input device 100. In one implementation the first state At 310, the processor 104 transmits an authentication indication. The authentication may include a user identifier and an indication of biometric authentication. The indication of biometric authentication may correspond to a key generated by the completion of the state machine corresponding to the correct entry of the predetermined sequence of inputs and a predetermined biometric data sequence. The key may be a hash of the values, only to verify the completion of the authentication on the biometric input device, while maintaining user privacy at the biometric input device. In another implementation, the key may include data identifying the user to an authentication service.

At 312, the processor 104 receives an authentication confirmation indication. The confirmation indication corresponds to the prior sent authentication indication validating that the biometric input device 100 has successfully authenticated and authorized the user to utilize an online service. The authentication confirmation indication may include an access indicator. The access indictor may include a user identifier, an indication of biometric authentication, and a user access level. The user identifier, the indication of biometric authentication, and the user access level may correspond to the online service and may differ from online service to online service.

Figure 4:
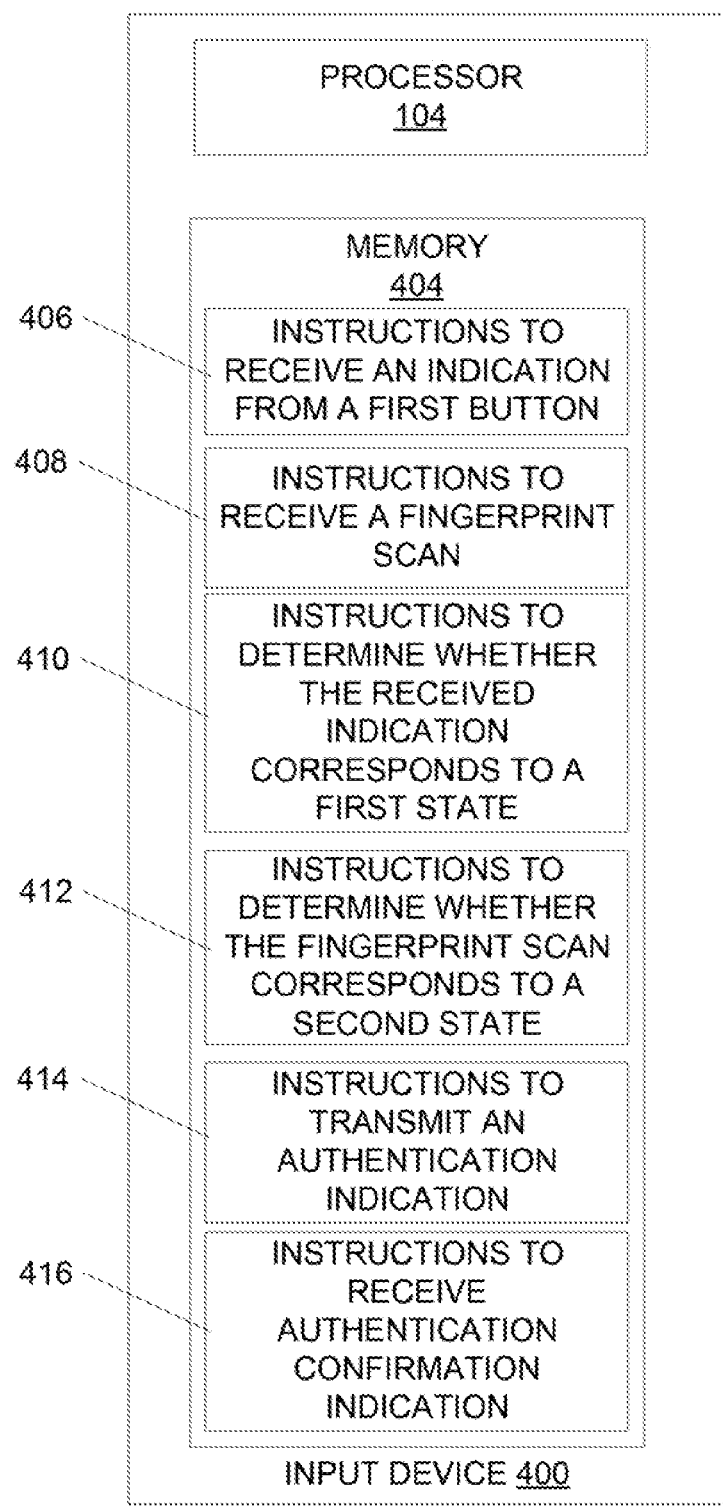
FIG. 4 is a computing device for supporting a biometric input device, according to an example.

FIG. 4 is an input device 400 for supporting a biometric input device, according to an example. The input device 400 depicts a processor 104 and a memory device 404 and, as an example of the input device 400 performing its operations, the memory device 404 may include instructions 406-414 that are executable by the processor 104. The processor 104 may be synonymous with the processor found in common computing environments including but not limited to central processing units (CPUs). In another implementation the processor 104 may be an embedded microcontroller for processing inputs. The memory device 404 can be said to store program instructions that, when executed by processor 104, implement the components of the input device 400. The executable program instructions stored in the memory device 404 include, as an example, instructions to receive an indication from a first button 406, instructions to receive a fingerprint scan 408, instructions to determine whether the received indication corresponds to a first state 410, instruction to determine whether the fingerprint scan corresponds to a second state 412, instructions transmit an authentication indication 414 and instructions receive authentication confirmation indication 416.

Memory device 404 represents generally any number of memory components capable of storing instructions that can be executed by processor 104. Memory device 404 is non-transitory in the sense that it does not encompass a transitory signal but instead is made up of at least one memory component configured to store the relevant instructions. As a result, the memory device 404 may be a non-transitory computer-readable storage medium. Memory device 404 may be implemented in a single device or distributed across devices. Likewise, processor 104 represents any number of processors capable of executing instructions stored by memory device 404. Processor 104 may be integrated in a single device or distributed across devices. Further, memory device 404 may be fully or partially integrated in the same device as processor 104, or it may be separate but accessible to that device and processor 104.

In one example, the program instructions 406-414 can be part of an installation package that, when installed, can be executed by processor 104 to implement the components of the input device 400. In this case, memory device 404 may be a portable medium such as a CD, DVD, or flash drive, or a memory maintained by a server from which the installation package can be downloaded and installed. In another example, the program instructions may be part of an application or applications already installed. In another example, the memory device 404 may be internal flash memory to an input device, wherein the program instructions 406-414 may be installed from the input device manufacturer. Here, memory device 404 may include integrated memory such as a flash ROM, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. An input device comprising:
   a plurality of input switches;
   a plurality of biometric sensors, wherein more than one of the plurality of biometric sensors are integrated into each one of plurality of input switches;
   a processor communicatively coupled to each of the plurality of input switches to:
      receive an indication from first input switch of the plurality of input switches;
      receive a biometric data collected by at the one of the plurality of biometric sensors corresponding to the first input switch from which the indication was received;
      determine whether the received indication corresponds with a first state in a predetermined sequence;

determine whether the biometric data corresponds with a second state in a predetermined biometric data sequence; and authenticate a user based on the first state and the second state.

2. The input device of claim 1, the authentication further comprising:

transmit an authentication indication to a service; and receive an authentication confirmation indication from the service, wherein the authentication confirmation indication corresponds to the authentication indication.

3. The input device of claim 2, wherein the service comprises an interactive video game online system.

4. The input device of claim 1, wherein the predetermined biometric data sequence corresponds to a sequence of fingerprint scans.

5. A method comprising:

receiving an indication from first input switch of a plurality of input switches;

receiving a biometric data collected by one of a plurality of biometric sensors corresponding to the first input switch from which the indication was received;

determining whether the received indication corresponds with a first state in a predetermined sequence, wherein the predetermined sequence corresponds to a sequence of input switch activations;

determining whether the biometric data corresponds with a second state in a predetermined biometric data sequence; and transmitting an authentication indication to a service; and receiving an authentication confirmation indication from the service, wherein the authentication confirmation indication corresponds to the authentication indication.

6. The method of claim 5, wherein the plurality of input switches comprises keys on a keyboard.

7. The method of claim 5, wherein the service comprises an interactive video game online system.

8. The method of claim 5, wherein the predetermined biometric data sequence corresponds to a sequence of fingerprint scans.

9. A computing device comprising:

a memory having instructions stored thereon; and a processor, when executing the instructions, to:

receive an indication from first button of a plurality of buttons;

determine whether the received indication corresponds with a first state in a predetermined sequence;

receive a fingerprint scan collected by a fingerprint scanner corresponding to the button from which the indication was received; and determine whether the fingerprint scan corresponds with a second state in a predetermined fingerprint scan sequence, wherein the predetermined fingerprint scan sequence corresponds to an ordered sequence of fingerprint scans.

10. The computing device of claim 9, wherein the predetermined sequence corresponds to an ordered sequence of button activations.

11. The computing device of claim 9, wherein the authentication indication comprises a user identifier and an indication of biometric authentication.

12. The computing device of claim 11, wherein the authentication confirmation indication comprises an access indicator corresponding to the user identifier, the indication of biometric authentication, and a user access level.

13. The computing device of claim 9, wherein the processor, when executing the instructions, is further to:

transmit an authentication indication to an online gaming service.

14. The computing device of claim 13, wherein the processor, when executing the instructions, is further to:

receive an authentication confirmation indication from the online gaming service.

15. The computing device of claim 14, wherein the authentication confirmation indication corresponds to the authentication indication.

\* \* \* \* \*